United States Patent Office 3,637,587
Patented Jan. 25, 1972

3,637,587
STABILIZATION OF ORGANIC SUBSTANCE WITH N,N-DISUBSTITUTED-AMINOALKYL PHOSPHITE
Henryk A. Cyba, Evanston, Ill., assignor to Universal Oil Products Company, Des Plaines, Ill.
No Drawing. Continuation-in-part of application Ser. No. 589,841, Oct. 27, 1966, now Patent No. 3,480,698, dated Nov. 25, 1969. This application Mar. 25, 1969, Ser. No. 810,372
Int. Cl. C08f 45/60
U.S. Cl. 260—45.9 R    10 Claims

ABSTRACT OF THE DISCLOSURE

Stabilizing organic substance by incorporating therein the stabilizing concentration of an N,N-dialkylaminoalkyl phosphite or N,N-dicycloalkyl-aminoalkyl phosphite. One example is the stabilizing of plastics and another example is the stabilization of hydrocarbon distillates.

CROSS REFERENCE TO RELATED APPLICATIONS

This is a continuation-in-part of copending application Ser. No. 589,841 filed Oct. 27, 1966, now U.S. Pat. No. 3,480,698 issued Nov. 25, 1969.

DESCRIPTION OF THE INVENTION

This invention relates to the stabilization of organic substrates by incorporating therein a novel additive comprising a phosphorus and nitrogen containing compound which, because of the particular chemical configuration, is of especial advantage for this use.

The novel additive of the present invention is of the following general formula:

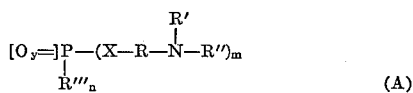    (A)

where $n$ ranges from zero to two, $m$ ranges from one to three, the sum of $m+n$ is three, $y$ is zero or one, X is oxygen or sulfur, R is alkylene of 1 to 4 carbon atoms, R' and R'' are alkyl or cycloalkyl, and R''' is hydrogen, alkyl, aryl or cycloalkyl, R''' being hydrogen when $y$ is one.

The novel additives are prepared in any suitable manner. For example, referring to Formula A, when X is oxygen and $n$ is zero, the additive compounds are preferably prepared by the reaction of a trialkyl phosphite or triphenyl phosphite with a dialkylaminoalkanol or a dicycloalkylaminoalkanol. These compounds are names as N,N-disubstituted-aminoalkyl phosphites. This is a transesterification reaction and accordingly the alkyl groups in the trialkyl phosphite preferably contain from 1 to 4 carbon atoms each and thus include trimethyl phosphite, triethyl phosphite, tri-n-propyl phosphite, triisopropyl phosphite and tributyl phosphite or mixed phosphites containing these alkyl groups. The reaction is effected in the presence of a basic catalyst including sodium carbonate, potassium carbonate, trialkyl amines including triethylamine, tripropylamine, tributylamine, etc. The reaction is readily effected by heating and refluxing the trialkyl or triphenyl phosphite and N,N-disubstituted-aminoalkanol to form the desired product. The temperature employed will be sufficient to vaporize the alcohol resulting from the transesterification and will be selected with reference to the particular phosphite used as a reactant. For example, when trimethyl phosphite is employed, the temperature will be above 65° C. When triphenylphosphite is employed, the temperature will be above 182° C. In general, the temperature will range from about 65° C. to 225° C. or more. The time of reaction will be sufficient to complete the reaction and may range from 0.25 to 12 hours or more. The reaction is illustrated by the following equation which describes the reaction of triethylphosphite with N,N-dibutylaminoethanol.

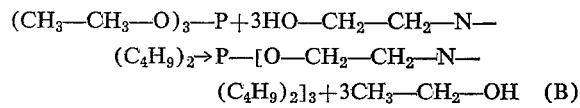

It is understood that the above equation is illustrative only and not intended as limiting. For example, as set forth in the description of Formula A above, the ethylene moiety may be propylene or butylene as defined by R in Formula A. It is understood that R will contain from 1 to 4 carbon atoms in a straight chain, but that it also may contain other hydrocarbyl and particular alkyl groups attached to either one or more of the carbon atoms in the straight chain. Similarly, it is understood that the two butyl groups in the Formula B may be replaced by methyl, ethyl or alkyl and preferably sec-alkyl groups containing 3 or from 5 to 30 carbon atoms or cycloalkyl and that these groups may be the same or different. The cycloalkyl preferably is cyclohexyl, although it may be cyclopropyl, cyclobutyl, cyclopentyl, cycloheptyl, cyclooctyl, etc. or mixtures thereof. Also, it is understood that the ethoxy groups attached to the phosphorus may be replaced by methoxy, propoxy, butoxy, and/or phenoxy groups. The alcohol formed in the transesterification reaction will correspond to the specific alkoxy groups attached to the phosphorus.

In another method of preparation, the dialkylaminoalkanol is reacted with phosphorus trichloride, phosphorus oxytrichloride or alkyl, aryl or alkaryl phosphorus dichloride. This reaction also is effected by heating and mixing the reactants in the presence of a basic hydrogen halide acceptor in substantially the same manner as hereinbefore set forth.

Equation B above illustrates the reaction in which $m$ is three and $n$ is zero. The following equation illustrates the reaction in which R''' is hydrogen, $n$ is one and $m$ is two. These compounds are named as N,N-disubstituted-aminoalkyl hydrogen phosphites. In the interest of simplicity, this reaction is illustrated in the same manner as Equation B with the understanding that it is for illustrative purposes only and not intended to be limiting.

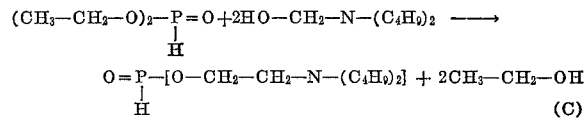

Referring to Equation C, it is understood that the different groups may be modified in the same manner as described in connection with Equation B. This reaction is effected in substantially the same manner as described in connection with Equation B.

It is understood that the novel additive compounds of the present invention may be prepared in any suitable manner. In a preferred embodiment, these compounds may be prepared by the reaction of the N,N-disubstituted aminoalkanol with phosphorus trichloride as hereinbefore described, phosphorus oxychloride, etc.

Furthermore, diaryl or dialkylphosphinous chloride will yield compounds of the following configuration:

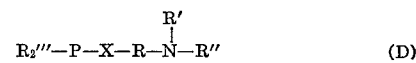    (D)

Aryl or alkyl phosphorus dichloride results in compounds of the following configuration:

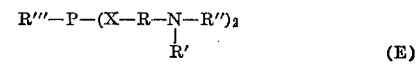    (E)

It is understood that X, R, R', R" and R'" have the designations hereinbefore set forth.

When X in Formula A is sulfur, an N,N-di-substituted aminothioalkanol is used as a reactant. The reaction will be effected in substantially the same manner as hereinbefore set forth. The N,N-di-substituted-aminothioalkanol is reacted with trialkylphosphite, dialkylphosphite, triphenylphosphite, phosphorus trichloride, phosphorus oxytrichloride, phosphorus thiotrichloride, phenyl phosphorus dichloride, etc. This reaction will be effected in substantially the same manner as hereinbefore set forth except for the use of the reactant containing sulfur. The product will be defined by Formula A above in which one or both of the X radicals are sulfur.

From the above description, it will be seen that the novel additive compounds of the present invention contain phosphorus, a tertiary nitrogen and oxygen and/or sulfur. These compounds will have varied utility and may be used for any purpose where such compounds are of advantage.

In one embodiment, the novel additive compounds of the present invention are used as antioxidants in hydrocarbon oils or synthetic oils which are subject to deterioration due to oxygen or other causes. For example, the novel additive compound is used as an additive in gasoline and serves as an antioxidant therein and also to form a coating on the internal parts of the combustion engine in the same manner as presently accomplished by tricresyl phosphate and thereby to improve the combustion occurring therein. In addition, the novel compound serves to prevent corrosion of the metal equipment, both in storage and use of the gasoline or other hydrocarbon oil.

When the novel additive compound of the present invention is used in low boiling oils such as gasoline, naphtha, light solvent, kerosene, etc., the substitutions on the nitrogen atom preferably each contain from about 1 to 6 carbon atoms. Illustrative additive compounds in this embodiment include beta-N,N-dimethylaminoethyl phosphite, beta-N,N-diethylaminoethyl phosphite, beta-N,N-dipropylaminoethyl phosphite, beta-N,N-dibutylaminoethyl phosphite, beta-N,N-dipentylaminoethyl phosphite, beta-N,N-dihexylaminoethyl phosphite, the propyl through hexyl substituents preferably being of sec-alkyl configuration, beta-N,N-dicyclopropylaminoethyl phosphite, beta-N,N-dicyclobutylaminoethyl phosphite, beta-N,N-dicyclopentylaminoethyl phosphite, beta-N,N-dicyclohexylamino phosphite, similarly substituted beta-N,N-di-substituted-aminopropylphosphites, gamma-N,N-di-substituted-aminopropylphosphites, beta - N,N - di - substituted-aminobutyl phosphites, gamma-N,N-di-substituted-aminobutyl phosphites, delta-N,N-di-substituted - aminobutyl phosphite, similarly substituted thiophosphites, similarly substituted hydrogen phosphites and similarly substituted hydrogen thiophosphites.

The additive compounds set forth above which contain from 1 to 6 carbon atoms in the substituents attached to the nitrogen atom also are useful as insecticides, pesticides, germicides, fungicides, bactericides, herbicides, etc. For example, the compound may be employed against many types of mites and insects including Corausius larvae, Cotoneaster aphid, apple aphid, black bean aphid, pea aphid, etc. Other larvae, mites, insects, etc. which may be controlled by the novel compounds of the present invention include flour beetle, Mexican bean beetle, black carpet beetle, milkweed bug, german cockroaches, southern army worms, mealy bug, sow bug, citrus red spider, greenhouse red spider, various mossuitoes, yellow fever mosquito, malarial mosquito, houseflies, etc. In such use the novel compound of the present invention preferably is prepared as a solution in a suitable solvent and used in this manner.

When the additive compound of the present invention is used in higher boiling oils or solid substrates, the substituents attached to the nitrogen atom preferably contain from 4 to 30 or more carbon atoms which preferably are of secondary alkyl configuration. Such higher boiling oils and solids include jet fuel, lubricating oil, diesel oil, fuel oil, residual oil, drying oil, grease, wax, asphalt, resin, plastic, rubber, etc. In one embodiment the compound of the present invention is advantageously used as an additive in lubricating oil which may be of natural or synthetic origin. The mineral oils include those of petroleum origin and are obtained from paraffinic, naphthenic, asphaltic or mixed base crudes. These oils are variously referred to as motor lubricating oil, railroad type lubricating oil, marine oil, diesel lubricating oil, differential oil, gear oil, cylinder oil, specialty products oil, etc. Other oils include those of animal, marine or vegetable origin.

Synthetic lubricating oils are of varied types and include aliphatic esters such as dialkyl sebacates and particularly dioctyl sebacate, dialkyl azelates, dialkyl suberates, dialkyl pimelates, dialkyl adipates, dialkyl glutarates, etc., polyalkylene oxides, including polyisopropylene oxide, polyisopropylene oxide diether, polyisopropylene oxide diester, etc., silicones, including methyl silicone, methylphenyl silicone, etc., esters of silicic acids, including tetraisooctyl silicate, etc., fluorine, substituted hydrocarbons, including fluorinated oil, perfluoro hydrocarbons, etc., neopentyl glycol esters, including neopentyl glycol propionates, neopentyl glycol butyrates, neopentyl glycol caproates, neopentyl glycol caprylates, neopentyl glycol pelargonates, etc., trimethylol alkane esters including esters of trimethylol ethane, trimethylol propane, trimethylolbutane, trimethylolpentane, etc. and particularly the triesters in which each ester portion contains from 3 to 12 carbon atoms.

Oils of lubricating viscosity also are used as transmission fluids, hydraulic fluids, industrial fluids, cutting oils, rolling oils, soluble oils, slushing oils, drawing compounds, etc. The lubricants include greases made by compositing one or more thickening agents with an oil of natural or synthetic origin. The metal base greases are classified as lithium grease, sodium grease, calcium grease, barium grease, potassium grease, aluminum grease, etc. and mixtures thereof. Another type of grease is prepared from oxidized petroleum wax. Other greases include petroleum grease, whale grease, wool grease, and those made from inedible fats, tallow, butcher's waste, etc.

When used in lubricating oil, the additive functions as a lubricity and/or extreme pressure agent, as well as an antioxidant. It also serves as a flame-proofing agent, detergent-dispersant, peroxide decomposer, corrosion inhibitor, rust inhibitor, etc.

In another embodiment the compound of the present invention is advantageously used as an additive in plastic. In this use the additive serves to retard deterioration due to ultraviolet light absorption, as well as to retard oxidative deterioration. In one embodiment the plastic is a solid polyolefin including those prepared from ethylene, propylene, butylene or mixtures thereof. Other plastics include ABS (acrylonitrile-butadiene-styrene polymers), polyphenyl ether (polyphenyl oxide), polystyrene, vinyl resins derived from monomers such as vinyl chloride, vinyl acetate, vinylidene chloride, including polyvinylchloride, copolymers of vinyl chloride with acrylonitrile, methacrylonitrile, alkyl acrylates, alkyl maleates, etc., polyurethanes, both urethane foams and solid resins, epoxy resins, polycarbonates, phenol-formaldehyde resins, urea-formaldehyde resins, melamine-formaldehyde resins, acryloid plastics, urea or cross-linked polyesters, etc.

As another advantage of the compounds of the present invention, these compounds also may be used as curing agents in plastics or resins which normally are cured in the course of their preparation. These include, among others, polyurethanes, epoxy resins, polycarbonates, phenol-formaldehyde resins, melamine-formaldehyde resins, etc.

In still another embodiment the additive compound of the present invention is used as an additive in rubber, including both natural and synthetic. In such use the additive serves both as an antioxidant and also to retard deterioration due to ultraviolet light absorption.

The novel additive compound of the present invention preferably is used as a solution in a suitable solvent. The solvent will be selected with reference to the particular substrate in which the additive is to be used. In one embodiment, the solvent conveniently comprises a hydrocarbon oil which generally will be aromatic, paraffinic, naphthenic or mixtures thereof. Aromatic solvents include benzene, toluene, xylene, ethyl benzene, cumene, etc. or mixtures thereof. Paraffinic hydrocarbons include pentane, hexane, heptane, octane, nonane, decane, etc., or mixtures thereof. Naphthenic solvents include cyclopentane, cyclohexane or mixtures thereof. The solution may be prepared to contain the compound of the present invention in a concentration of from about 5% to about 80% by weight and generally from about 20% to about 60% by weight.

It is understood that the additive compound of the present invention may be used along with other additives incorporated in the particular substrate. For example, when used in gasoline, a metal deactivator, deicer, detergent, dye, etc., also may be employed. When used in lubricating oil, other additives include viscosity index improvers, pour point depresser, anti-foam additive, detergent, etc. When used in plastic or other substrate an additional antioxidant also may be used and can produce a synergistic effect. The preferred additional antioxidants are of the phenolic type and include tertiary butyl catechol, 2,6-di-tertiary-butyl-4 - methylphenol, 2,4 - dimethyl - 6 - tertiary-butylphenol, 2 - tertiary-butyl - 4 - methoxyphenol, 2 - tertiary-butyl-4-ethoxyphenol, 3,3',5,5'-tetra-tertiary - butyl - dihydroxyphenol-methane, etc. Other additional antioxidants are of the amine type including N,N'-dialkyl or N,N'-diaryl or N,N'-dicycloalkyl-ortho or para-phenylenediamines, di- or tetra-alkyl or cycloalkyl diaminodiphenyl alkanes, ethers, sulfides or amines.

Other additives which may be used in conjunction with the additive compound of the present invention and which may produce a synergistic effect are of varied chemical classes. These additional additives include a hydroxyphenone, which may be an alkylhydroxyphenone, an arylhydroxyphenone, a cycloalkylhydroxyphenone, and especially a hydroxybenzophenone, particularly 2-hydroxybenzophenone, 2,2'-dihydroxybenzophenone or trihydroxy or tetrahydroxy benzophenone, alkoxy substituted benzophenones in which the alkoxy moiety contains 1 to 20 carbon atoms, especially 2-hydroxy-4-octoxybenzophenone, or alkyl substituted benzophenones in which the alkyl group contains from 1 to 30 carbon atoms. Another additional additive is a benzotriazole and especially N-hydroxyphenyl-benzotriazole, as well as substituted derivatives thereof including particularly 2-(2'-hydroxy-5'-alkylphenyl)-benzotriazole in which the alkyl contains from 1 to 20 carbon atoms, such as 2-(2'-hydroxy-5'-methylphenyl)-benzotriazole, 2-(2'-hydroxy-3',5'-dialkylphenyl)-benzotriazole in which each alkyl contains from 1 to 20 carbon atoms, such as 2-(2'-hydroxy-3',5'-dimethylphenyl)-benzotriazole, alkoxy substituted derivatives including 2-(2'-hydroxy-5'-methoxyphenyl)-benzotriazole, 2-(2'-hydroxy-5'-octoxyphenyl)-benzotriazole, etc., and those containing both alkoxy and alkyl substitutions, each containing from 1 to 20 carbon atoms, such as, 2-(2'-hydroxy-3'-methoxy - 4' - methylphenyl)-benzotriazole, 2-(2'-hydroxy-3'-ethoxy-4'-methylphenyl)-benzotriazole, 2 - (2'-hydroxy-3'-octoxy-4'-butylphenyl)-benzotriazole, etc. Another additional additive is a salicylic acid ester including phenyl salicylate, p-alkylphenyl salicylates in which the alkyl contains from 1 to 30 carbon atoms including, for example, p-t-butylphenyl salicylate, p-octylphenyl salicylate, etc. Still other additional additives include 1,1,3-tris-(2-methyl - 4 - hydroxy-5-tert-butylphenyl)-butane, 2,4-bis-(3,5-di-tert-butyl-4-hydroxyphenyl)-butane and corresponding compounds in which the alkyl groups contain from 1 to 20 carbon atoms each and the butane is replaced by an alkane group of from 1 to 10 carbon atoms. Still another additional additive is dilauryl-thiodipropionate, dicapryl-thiodipropionate, dimyristyl-thiodipropionate, dipalmityl-thiodipropionate, distearyl-thiodipropionate, etc.

Still other additional additives which may be used in conjunction with the additive compound of the present invention are dihydroxydiphenyl sulfide and alkylated derivatives thereof including, for example, 4,4'-thio-bis-(6-tert-butyl-o-cresol), 4,4'-thio-bis-(6-sec-octyl-o-cresol), etc. In still another embodiment the additional additive comprises various tin containing compounds including, for example, dialkyl tin maleate, dibutyl tin di-(isooctylthioglycolate), dioctyl tin di-(isooctyl-thioglycolate, dibutyl tin, di-(lauryl mercaptide), dibutyl tin mercaptide carboxylates, polyamine tin mercaptides, etc. Also included are zinc dithiophosphates.

The additional additive will be used in a sufficient amount to obtain the desired benefits and may range from 10% to 100% by weight or more of the additive compound of the present invention.

The concentration of the additive compound of the present invention will vary with the particular substrate. The additive may be used in a concentration of from about 0.001% to about 25% by weight and more particularly from about 0.005% to about 5% by weight of the substrate.

The following examples are introduced to illustrate further the novelty and utility of the present invention but not with the intention of unduly limiting the same.

EXAMPLE I

The additive compound of this example is beta-N,N-ditallowaminoethyl phosphite and was prepared by reacting beta-N,N-di-tallow - aminoethanol with phosphorus trichloride. The N,N-di-tallow-ethanolamine was prepared by the oxyethylation of N,N-di-tallow-amine.

The additive compound of this example was prepared by charging 53.7 g. (0.1 mole) of N,N-di-tallow-aminoethanol, 20.2 g. (0.2 mole) of triethylamine as catalyst and 200 grams of anhydrous ether into a one liter 3-neck reaction flask. The mixture was heated to 35° C., with continuous stirring. Nitrogen also was blown into the reaction flask. A calcium chloride tube was attached to the condensor to prevent intake of moisture. Upon heating and stirring the mixture formed a homogeneous solution. Then 4.5 g. (0.03 mole) of phosphorus trichloride was dissolved in 50 g. of ether and added dropwise to the heated and stirred mixture. This precipitated triethylamine hydrochloride. The heating and stirring were continued for 4 hours, after which the white precipitate was vacuum filtered and washed with 200 g. of hexane. The filtrate was air dried and 18 g. were recovered. The main portion of the desired product was contained in the triethylamine hydrochloride and was recovered therefrom by suspending it in warm benzene, purifying by mixing with activated charcoal, filtering and distilling off the benzene and ether. The crude product was distilled and the desired product was recovered as a solid. The product was recovered in a yield of 57.4% of theoretical. Theoretical percent of phosphorus for beta-N,N-di-tallow-aminoethyl phosphite is 1.88%; found by analysis is 1.55%.

EXAMPLE II

The additive compound of this example is beta-N,N-diethylaminoethyl phosphite and is prepared by transesterification of tributyl phosphite with N,N-diethyl-aminoethanol. The reaction is effected by refluxing at a temperature of about 140° C. one mole proportion of tributyl phosphite with 3 mole proportions of N,N-diethylaminoethanol. Refluxing is continued until 3 mole proportions of butyl alcohol are liberated and removed from the reaction vessel, after which the desired product is recovered from the reaction mixture. The reaction is effected in the presence of sodium carbonate catalyst. Recovery of the product is accomplished by filtering to remove the catalyst and by distilling the product. Beta-N,N-diethylaminoethyl phosphite is formed as a 50% by weight solution in toluene and is used in a concentration of 0.01% by weight of the solution as an additive in gasoline.

EXAMPLE III

The additive compound of this example is gamma-N,N-dicyclohexyl-aminopropyl phosphite and is prepared in substantially the same manner as described in Example II. In this preparation one mole proportion of triphenyl phosphite is reacted with three mole proportions of gamma-N,N-dicyclohexyl-aminopropanol in the presence of potassium carbonate catalyst and ether solvent. The reactants are refluxed at a temperature of about 130° C. for sufficient time to distill overhead the phenol formed in the transesterification reaction. Vacuum is applied to facilitate the removal of phenol formed in the reaction. The final product is recovered and purified in substantially the same manner as hereinbefore set forth.

EXAMPLE IV

The additive compound of this example is beta-N,N-di-sec-octyl-aminoethyl hydrogen phosphite and is prepared in substantially the same manner as hereinbefore described by reacting one mole proportion of dibutyl hydrogen phosphite with two mole proportions of beta-N,N-di-sec-octyl-aminoethanol. The transesterification temperature is 140°–180° C. and the reaction is continued until 2 mole proportions of butanol are distilled overhead. The product then is recovered and purified in substantially the same manner as hereinbefore set forth.

EXAMPLE V

The additive compound of this example is prepared by refluxing one mole proportion of phosphorus trichloride wtih 3 mole proportions of beta-N,N-dimethylaminothioethanol. Refluxing is continued until the theoretical amount of hydrogen chloride is removed overhead and the product is recovered and purified in substantially the same manner as hereinbefore set forth.

EXAMPLE VI

The additive compound of this example is prepared by the reaction of one mole proportion of benzenephosphorusoxydichloride with two mole proportions of beta-N,N-diisopropylaminothioethanol. The refluxing is effected at a temperature of about 46° C. in diethylether and in the presence of triethylamine and is continued until the theoretical amount of hydrogen chloride as triethylamine salt is precipitated and removed by filtration and washing. The desired product is recovered and purified in substantially the same manner as hereinbefore set forth.

EXAMPLE VII

The additive compound of this example is prepared by the reaction of one mole proportion of phosphorus thiotrichloride with three mole proportions of beta-N,N-dimethylaminoethanol. The reaction is effected in substantially the same manner as hereinbefore described by heating and refluxing the mixture in the presence of a basic catalyst and solvent until the theoretical amount of liberated hydrogenchloride is removed, after which the product is recovered and purified.

EXAMPLE VIII

As hereinbefore set forth the additives of the present invention are useful in plastic to retard deterioration of the plastic due to oxidation and ultraviolet light absorption. The additive compound prepared as described in Example I is utilized in a special batch of commercial solid polypropylene which was obtained free of inhibitors.

The polypropylene used in this example is stated to have properties substantially as set forth in the following

TABLE I

| | |
|---|---|
| Specific gravity | 0.910–0.920 |
| Refractive index, $n_D^{25}$ | 1.510 |
| Heat distortion temperature: | |
| At 66 p.s.i. load ° F. | 240 |
| At 264 p.s.i. load ° F. | 150 |
| Tensile yield strength (ASTM D–638–58T) (0.2" per min.) p.s.i. | 4700 |
| Total elongation, percent | 300–400 |
| Stiffness flexural (ASTM D747–50) $10^5$ p.s.i. | 1.8 |
| Shore hardness (ASTM D676–55T) | 74D |

The solid polypropylene was milled in a two-roll heated mill of conventional commercial design and the additive, when used, was incorporated in the sample of polypropylene during the milling. The samples were pressed into sheets of about 17 mil thickness and cut into plaques of about 1⅜ inches by 1½ inches. The plaques were exposed to weathering on an outdoor rack facing south and inclined at a 45° angle at Des Plaines, Ill. The samples were analyzed periodically by infrared analysis and the intensity of the carbonyl band at 1715 cm.$^{-1}$ was determined and reported as "carbonyl number." The higher intensity of the carbonyl band indicates a higher carbonyl concentration (expressed as carbonyl number) and, accordingly, increased deterioration.

Deterioration of the polyolefin exposed outdoors increases rapidly during the late spring, summer and early fall months. A sample of the polypropylene was placed outdoors about the middle of May and by the end of the month, had increased from an initial carbonyl number of 144 to a carbonyl number of 764. Another sample of the solid polypropylene was placed outdoors on October 6 and increased to a carbonyl number of greater than 1000 within 15 days. It is apparent that this polypropylene, without additive, was undergoing rapid deterioration.

A sample of the polyolefin containing 1% by weight of beta-N,N-ditallow-aminoethylphosphite, prepared as described in Example I, was placed outdoors on September 21 and increased from an initial carbonyl number of 237 to a carbonyl number of 458 after 184 days of outdoor exposure. Also of importance is the fact that the polypropylene did not undergo discoloration. These data demonstrate that the compound of the present invention was very effective in retarding deterioration of the propylene.

EXAMPLE IX

Another sample of the polypropylene described in Example VIII was prepared to contain 1% by weight of beta-N,N-ditallow-aminoethylphosphite, prepared as described in Example I, and 0.5% by weight of butylated hydroxytoluene (2,6 - di - tertiary-butyl-4-methylphenol). This sample was evaluated in the same manner as described in Example VIII. The sample was placed outdoors on Sept. 27 and increased in carbonyl number from an initial of 273 to 320 after 209 days of outdoor exposure. The butylated hydroxytoluene by itself is of only minor effectiveness as additive for this purpose. However, it appears that a synergistic effect is obtained by using a mixture of the compound of the present invention and the butylated hydroxytoluene.

EXAMPLE X

The plastic of this example is a special batch of commercial high density polyethylene. Plaques of this polyethylene were prepared in substantially the same manner as described in Example VIII. A sample of the polyethylene without inhibitor, when exposed outdoors in the middle of May, underwent an increase in carbonyl number of 720 by the end of August. Another sample of the polyethylene is formulated to contain 1% by weight of beta-N,N-di-sec-octylaminoethyl hydrogen phosphite, prepared as described in Example IV. Another sample of the polyethylene is prepared to contain 1% by weight of this additive and 0.25% by weight of 2,4-di-methyl-6-tertiary-butylphenol. When exposed outdoors, the last two samples of polyethylene containing the additive and additive mixture will be protected against deterioration due to oxidation and U.V. absorption.

EXAMPLE XI

The plastic of this example is polystyrene. During milling of the polystyrene, 1% by weight of gamma-N,N-dicyclohexyl aminopropyl phosphite, prepared as described in Example III, is incorporated in the polystyrene. This serves to inhibit deterioration of the polystyrene upon exposure to weather.

EXAMPLE XII

As hereinbefore set forth, the lower alkyl derivatives are useful as insectcides. An insecticidal concentration is prepared by dissolving 1 g. of beta-N,N-diethylaminoethyl phosphite, prepared as described in Example II, in 2 cc. of benzene and emulsifying the resultant solution with 100 cc. of water with Triton X–100 as the emulsifying agent. The resulting emulsion is sprayed into a cage containing houseflies and results in greater than 90% knockdown.

EXAMPLE XIII

This example illustrates the use of the additive compound of the present invention as an additive in lubricating oil. The lubricating oil used in this example is synthetic dioctyl sebacate marketed under the name "Plexol." The additive is beta-N,N-sec-octyl-aminoethyl hydrogen phosphite, prepared as described in Example IV, and is incorporated in a concentration of 1% by weight in the dioctyl sebacate. This serves to improve the lubricity properties of the lubricating oil and to retard deterioration thereof during use at elevated temperature.

EXAMPLE XIV

The lubricating oil of this example is marketed commercially as "Carnes 340 White Oil." The additive of this example is beta-N,N-ditallow-aminoethyl phosphite, prepared as described in Example I, and is incorporated in a concentration of 1% by weight in the white oil.

EXAMPLE XV

This example illustrates the use of gamma-N,N-dicyclohexyl-aminopropyl phosphite, prepared as described in Example II, as an additive in grease. The additive is incorporated in a concentration of 1% by weight in a commercial Mid-Continent lubricating oil having a S.A.E. viscosity of 20. Approximately 92% of the lubricating oil then is mixed with approximately 8% by weight of lithium stearate. The mixture is heated to about 450° F., with constant agitation. Subsequently, the grease is cooled, while agitating, to approximately 248° F., and then the grease is further cooled slowly to room temperature.

The stability of the grease is tested in accordance with ASTM D–942 Method, in which method a sample of the grease is placed in a bomb and maintained at a temperature of 212° F. Oxygen is charged to the bomb, and the time required for a drop of five pounds pressure is taken as the Induction Period. A sample of the grease without additive will reach the Induction Period in about eight hours. On the other hand, a sample of the grease containing 1% by weight of the additive of the present invention will be of substantially higher stability.

EXAMPLE XVI

This example illustrates the use of an additive compound of the present invention in fuel oil. The additive is beta-N,N-di-sec-octyl-aminoethyl hydrogen phosphite, prepared as describde in Example IV, and is incorporated in the fuel oil in a concentration of 0.01% by weight. This serves to retard sediment formation in the fuel oil and also to disperse any sediment which may be formed in the oil.

EXAMPLE XVII

The plastic of this example is ABS. During milling thereof, 1% by weight of beta-N,N-dicyclohexylaminoethyl phosphite is incorporated in the plastic mass. This serves to inhibit deterioration of the ABS upon exposure to weathering.

I claim as my invention:

1. Solid polymer, normally subject to deterioration due to oxidation, ultraviolet light absorption, weathering or a combination thereof, selected from the group consisting of polymer of a $C_2$–$C_4$ monoolefin and polystyrene, containing a stabilizing concentration of an additive compound having the formula:

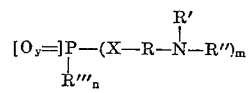

where X is oxygen or sulfur; R is alkylene of 1 to 4 carbon atoms, R' and R" are alkyl or cycloalkyl, R''' is hydrogen, alkyl, aryl or cycloalkyl, $n$ ranges from zero to two, $m$ ranges from one to three, the sum of $m+n$ is three, and $y$ is zero or one, R''' being hydrogen when $y$ is one.

2. The composition of claim 1 in which said additive compound is N,N-dialkyl-aminoalkyl phosphite.

3. The composition of claim 2 in which said additive compound is beta-N,N-ditallow-aminoethyl phosphite.

4. The composition of claim 1 in which said additive compound is N,N-dicycloalkyl-aminoalkyl phosphite.

5. The composition of claim 4 in which said additive is N,N-dicyclohexyl-aminoalkyl phosphite.

6. The composition of claim 1 which said additive compound is N,N-dialkyl-aminoalkyl hydrogen phosphite.

7. The composition of claim 1 in which said additive compound is N,N-dicycloalkyl-aminoalkyl hydrogen phosphite.

8. The solid polymer of claim 1 being polyethylene.
9. The solid polymer of claim 1 being polypropylene.
10. The solid polymer of claim 1 being polystyrene.

References Cited

UNITED STATES PATENTS

| | | | |
|---|---|---|---|
| 2,911,430 | 11/1959 | Fitch | 206—945 |
| 2,917,533 | 12/1959 | Burger | 260—945 |
| 3,172,871 | 3/1965 | Malz et al. | 260—45.9 |
| 3,480,698 | 11/1969 | Cyba | 260—45.9 |

DONALD E. CZAJA, Primary Examiner

V. P. HOKE, Assistant Examiner

U.S. Cl. X.R.

260—2 EP, 2 N, 2.5 BB, 2.5 AC, 45.75 R, 45.75 K, 45.85, 45.95, 47 XA, 59, 67.6 R, 77.5 AC